Oct. 16, 1923. 1,470,828
J. W. GORMAN
SIDE BUMPER FOR VEHICLES
Filed May 23, 1923   2 Sheets-Sheet 1

Inventor
John W. Gorman
By Harry D. Wallace
Attorney.

Oct. 16, 1923.
J. W. GORMAN
1,470,828
SIDE BUMPER FOR VEHICLES
Filed May 23, 1923   2 Sheets-Sheet 2
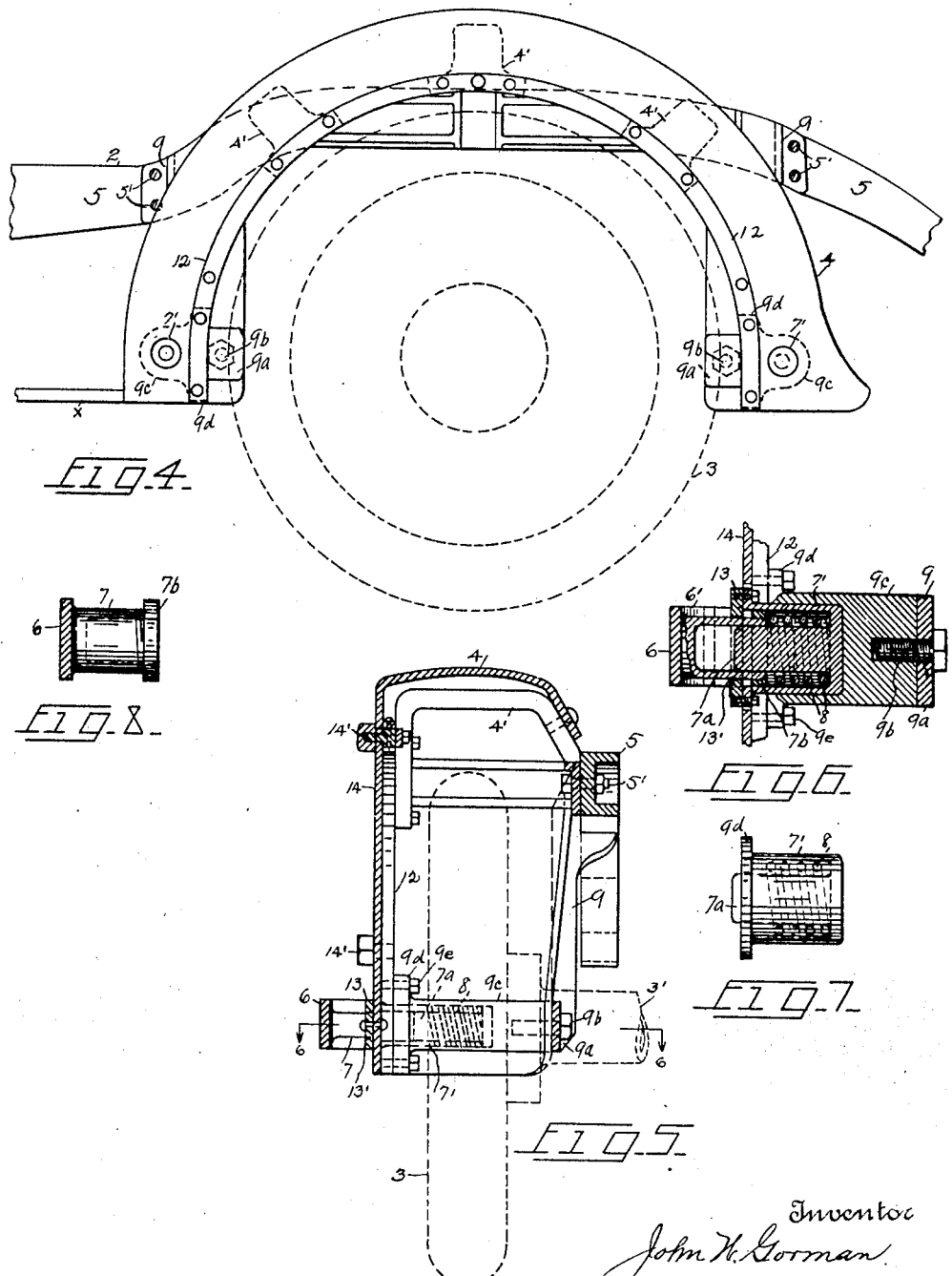

Patented Oct. 16, 1923.

1,470,828

UNITED STATES PATENT OFFICE.

JOHN W. GORMAN, OF EAST SYRACUSE, NEW YORK.

SIDE BUMPER FOR VEHICLES.

Application filed May 23, 1923. Serial No. 640,896.

*To all whom it may concern:*

Be it known that I, JOHN W. GORMAN, a citizen of the United States, residing at East Syracuse, in the county of Onondaga and State of New York, have invented certain new and useful Improvements in Side Bumpers for Vehicles, of which the following is a specification.

This invention relates to bumpers or fenders, for protecting the rear-mud-guards and wheels of auto vehicles and the like.

The object of the invention is to provide resilient bumpers of the class, which are mounted outside of the rear wheels, the said bumpers being disposed lengthwise of the vehicle, and being arranged to absorb all shocks due to side collisions or side-wiping, which may result from skidding of the vehicle towards other vehicles, pedestrians, or stationary objects. And a further object is to provide novel, simple and strong means for mounting the bumpers, and for shielding the rear parts of the vehicle above the bumpers.

I attain these objects by the means set forth in the detailed description which follows, and as illustrated by the accompanying drawings, in which—

Figure 1:
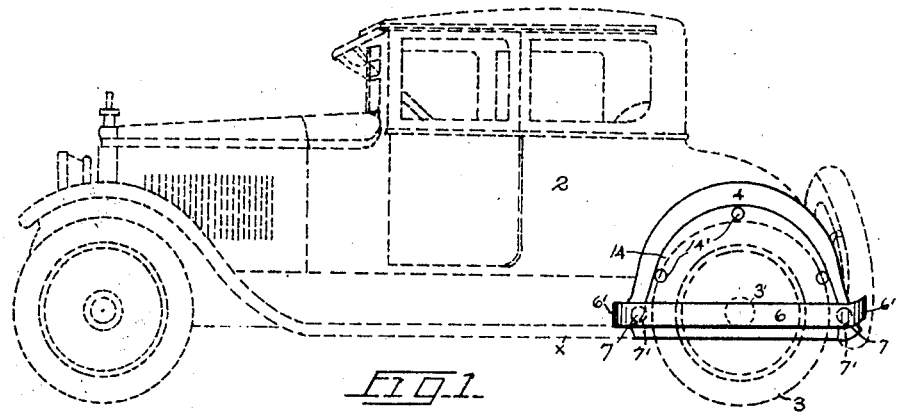
Figure 2:
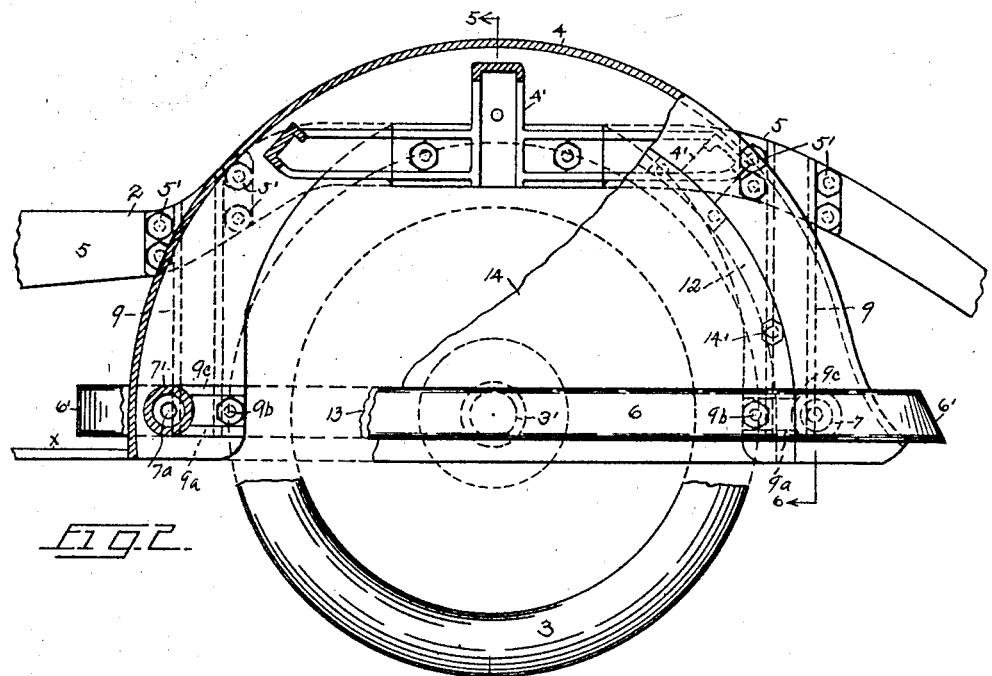
Figure 3:
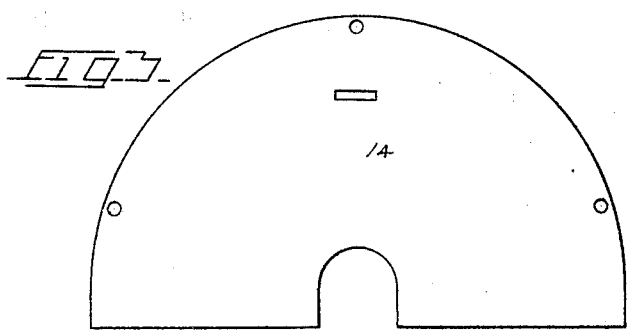

Figure 1 is a side view of an automobile, to which my improvement is applied. Fig. 2 is a side elevation and partial section; showing the means for mounting the bumpers. Fig. 3 is a view of the semi-circular wheel guard. Fig. 4 is a view showing the arch that supports the bumper and guard. Fig. 5 is a transverse vertical section, taken substantially on line 5—5 of Fig. 2. Fig. 6 is a vertical section, taken on line 6 of Fig. 2. Fig. 7 is an elevational view of one of the cushion-spring sockets. And Fig. 8 is a view of one of the socket members carried by the bumper.

In the drawing, 2 represents generally an automobile, and 3 is one of the rear wheels, which is supported by the usual axle 3'. 4 represents one of the rear mud-guards, which is supported by the usual brackets 4', the latter being rigidly secured to the chassis 5, as best seen in Fig. 5.

6 represents one of my improved bumpers, and comprises a relatively stout flat metal bar, which is preferably disposed edgewise and longitudinally of the vehicle, substantially in line with the running-board $x$ and the axis of the wheel 3, as shown in Figs. 1 and 2. The bumper 6 is preferably slightly longer than the horizontal span of the curved mud-guard 4, as shown in Figs. 1 and 2, and its opposite ends are preferably curved inwardly, as shown at 6', for effecting a glancing blow when the bumper impinges against another vehicle or object. The bumper 6 is supported near its opposite ends by means of similar hollow cylindrical socket members 7 and 7', which are preferably positioned forwardly and rearwardly of the wheel 3. The socket members 7 are preferably rigid to the inner face of the bumper body and telescope the socket members 7', the latter preferably housing cushion springs 8, which are engaged by the inner ends of the members 7, for affording suitable resiliency when the bumpers strike solid or heavy objects (see Fig. 6). The members 7' are preferably formed with concentric cores 7ª, around which the springs 8 are coiled, and which telescope the hollow portions of the members 7, thereby steadying and strengthening the socket connections. The inner ends of the members 7 are preferably threaded, and are fitted with threaded collars 7ᵇ, which prevent their accidental detachment from the socket members 7', when the parts are in the operative position shown in Fig. 6. The bumper 6 is normally held in the extended position, shown by the full lines in Figs. 5 and 6 by the springs 8. The bumper and the socket members 7—7' are partially supported by similar L-shaped brackets or hangers 9, whose top ends are rigidly secured to the chassis 5, by bolts 5'; while their lower ends 9ª support, and are detachably secured, by bolts 9ᵇ, to horizontal arms 9ᶜ, which extend past the front and rear margins of the wheel 3. The arms 9ᶜ are spaced to clear the wheel 3, and their outer ends are bored out to receive the socket members 7', as best seen in Figs. 5 and 6; the said ends being provided with flanges 9ᵈ, which are secured to a steel arch 12, by bolts 9ᵉ. The arch 12 is disposed concentrically to the wheel 3, and is supported by the brackets 4', and also by the outer depending margin of the rear mud-guard 4, as shown in Fig. 5. The arch 12 is preferably disposed in a vertical plane beyond and parallel to the outer face of the wheel 3. The socket members 7' extend beyond the flange-ends of the arms 9ᶜ, and their outer ends are bolted to and are braced by a horizontal guard-bar 13, which extends across the outer face of the wheel 3 and parallel to the bumper 6, as best seen in Figs. 5 and 6. The bar 13 is perforated at 13', to receive and guide the socket members 7, as shown in Fig. 6, and serves to limit the outward movements of the bumper. The usual semi-circular opening in the mud-guard 4, in which the wheel 3 is disposed, may be closed, for suitably shielding the said wheel, by a similarly shaped sheet metal guard plate 14, as shown in Figs. 1, 2, 3, 5 and 6. The plate 14 being rigidly secured to the arch 12, by bolts 14", tends to ward off any heavy blows or shocks that might be delivered above the bumper 6. The use of the guard plate is optional, but I prefer to employ it in combination with the bumper, for preventing spreading of the arch 12 and the arms 9°, as well as for preventing the smashing or disfiguring of the wheel and mud-guard, by collisions with objects that extend above the bumper structure. By disposing the plate 14 as herein shown, the whole bumper structure is adequately braced, and is therefore less liable to become impaired or weakened by the vibrations of the vehicle, or by collisions.

Having thus described my invention, what I claim, is—

1. A side bumper for vehicles, comprising a curved body extending lengthwise of the vehicle having socket members spaced to clear the wheel, L-shaped brackets disposed between the adjacent chassis member and wheel and having parts that aline with and telescopically receive said socket members, cushion means carried by said brackets for resiliently holding said body extended, an arch for partially supporting said brackets, and means for preventing the arch and the brackets from spreading.

2. A side bumper for auto vehicles, including a body horizontally disposed outside of the rear wheel of the vehicle having male socket members spaced to clear the wheel, female socket members partially supported by the adjacent chassis member alining with and telescopically receiving the male members, an arch supporting the outer ends of the female socket members, a guard for guiding the male socket members, and a plate over-lapping said arch for preventing the spreading of the arch.

3. A side bumper for vehicles, including a body disposed lengthwise of the vehicle and spaced from the outside of the rear wheel having rigid socket members facing the vehicle, brackets secured to the chassis member and depending between the wheel and said member, the lower ends of said brackets having horizontal arms that straddle the wheel and aline with said socket members, the outer ends of the arms being hollow and telescopically receiving said socket members, and an arch disposed concentrically to the wheel adapted to support the outer ends of said arms.

4. A side bumper for vehicles comprising a horizontally disposed curved bar extending lengthwise of the vehicle substantially in the plane of the horizontal axis of the rear wheel, said bumper having socket member spaced to clear the wheel, brackets secured to the adjacent chassis member between said member and the wheel said brackets having hollow arms that aline with the socket members of the bumper, socket members disposed in the hollow arms and telescopically receiving the socket members of the bumper, and means for resiliently holding the bumper in the extended position.

5. A side bumper for auto vehicles, comprising a body disposed horizontally and lengthwise across the axis of the rear wheel, L-shaped brackets supported by and depending from the adjacent chassis member, the horizontal arms of said brackets arranged to straddle the wheel and their outer ends being hollow, an arch disposed concentrically to the wheel and supporting the outer ends of said bracket arms, socket members seated in said arms, and corresponding socket members carried by the bumper body adapted to telescope the members carried by said arms, and cushion springs carried by the latter socket members adapted to resiliently support the bumper.

6. A side bumper for auto vehicles, including a horizontally disposed body positioned lengthwise of the vehicle substantially in the plane of the horizontal axis of the rear wheel, said body having inwardly projecting socket members near its ends spaced to clear the wheel, brackets depending from the adjacent chassis member between the said member and the wheel and having horizontal arms alining with the socket members of said body, socket members carried by said arms adapted to telescopically receive the socket members of said body, and a guard-bar supporting the outer ends of the socket members of the arms and having perforations for receiving and guiding the socket members of the body.

In testimony whereof I affix my signature.

JOHN W. GORMAN.